UNITED STATES PATENT OFFICE.

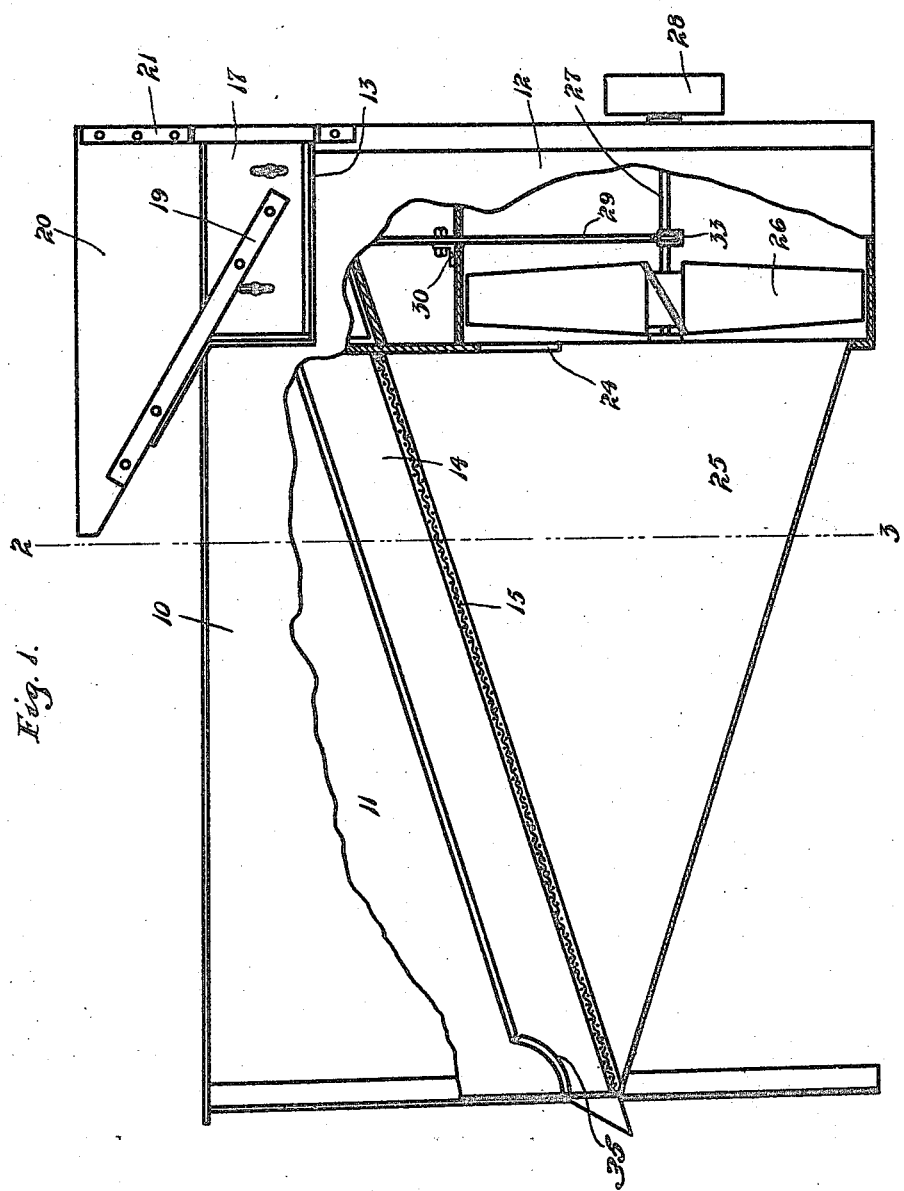

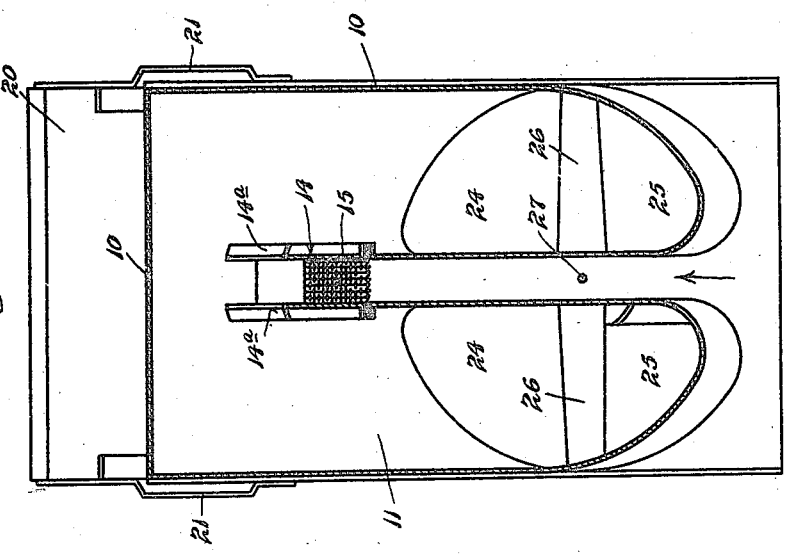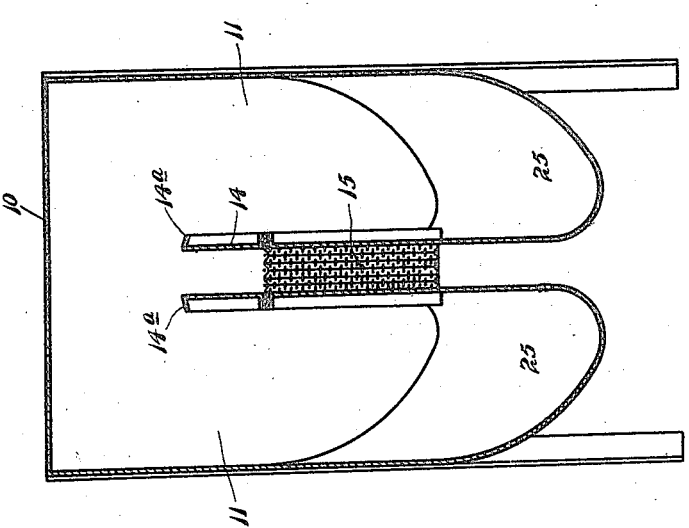

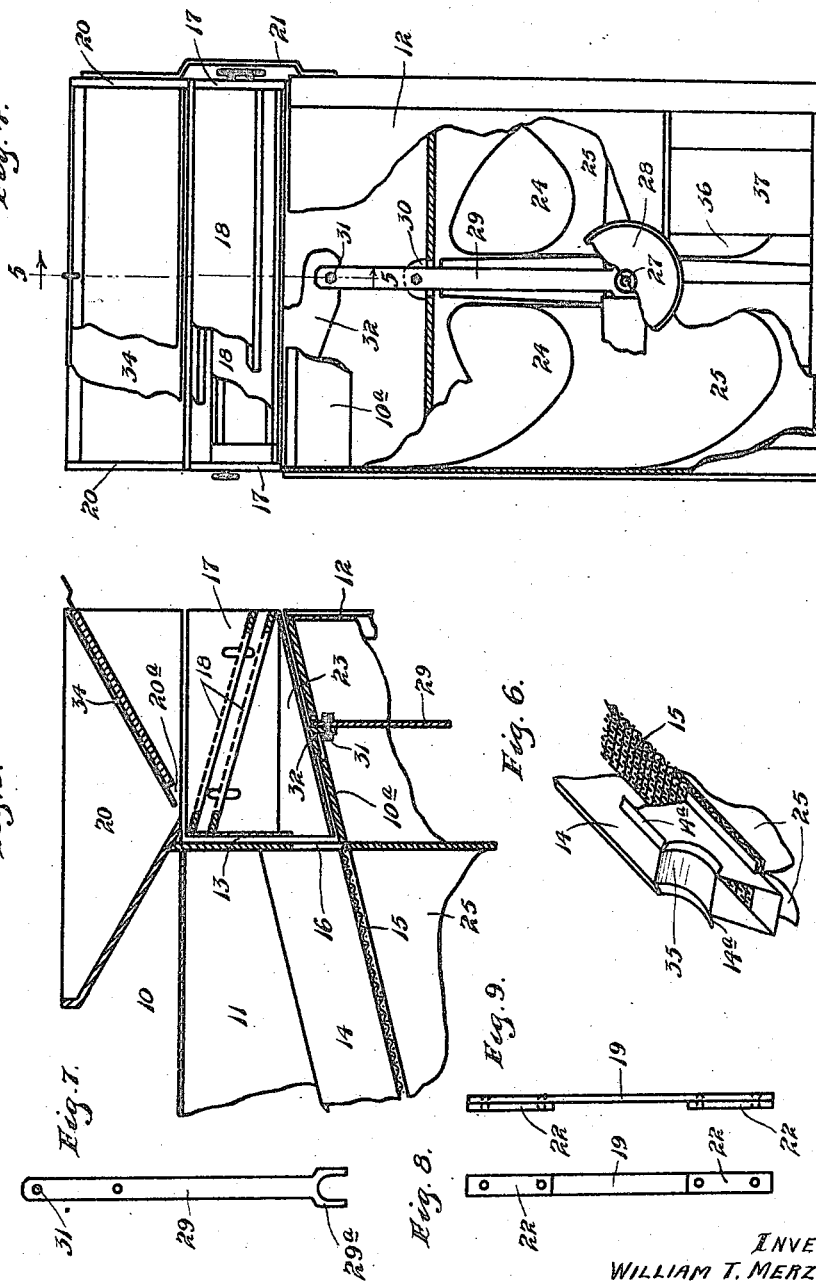

WILLIAM T. MERZENICH, OF MINNEAPOLIS, MINNESOTA.

GRAIN SEPARATOR.

1,416,489.  Specification of Letters Patent.  Patented May 16, 1922.

Application filed April 30, 1920. Serial No. 377,859.

*To all whom it may concern:*

Be it known that I, WILLIAM T. MERZENICH, a citizen of the United States, residing at Minneapolis, in the county of Hennepin and State of Minnesota, have invented certain new and useful Improvements in Grain Separators; and I do hereby declare the following to be a full, clear, and exact description of the invention, such as will enable others skilled in the art to which it appertains to make and use the same.

Primarily, my invention has for its object to provide an improved grain separator for the separation of grain mixtures generally known as succotash and which mixtures comprise wheat, oats and various foreign materials, such as chaff, dirt, small seeds, cockle, and the like.

However, the improved separator is capable of much more general use for the separation of various different kinds of commingled materials which have different shapes of specific gravity adapting certain thereof to be carried off by a forced current of air of less velocity or carrying capacity than required to lift or carry away certain other of the materials. Separators of this character are generally designated as fanning mills.

More particularly, this invention relates to that type of fanning mill, wherein the succotash, or other material, is caused to flow down an inclined trough or runway that is provided with a perforate bottom, through which a forced current of air is caused to flow, by the action of a fan, and in which, for the separation of succotash, the air current produced is of sufficient velocity to carry out of the trough all but the good clean wheat.

Hitherto, in fanning mills or separators of this character, there has been provided precipitating channels or chambers at the opposite sides of a central trough or runway and the operation was such that only the air and some of the very light materials would be carried to the fan and discharged from the fan, and much of the foreign materials would be deposited in the precipitating channels or chambers. In some instances, the air blast has been circulated continously through the machine, and through intercepting screens; but in such arrangements, the screens have become clogged and the efficiency of the machine soon greatly reduced and the machine ultimately rendered inoperative until cleaned.

In my improved fanning mill or separator, I employ a central inclined trough or runway having a perforate bottom, combined with an enclosing casing and a fan, and with the fan arranged to act as a suction fan connected to the air chamber above the trough, by laterally spaced air channels or chambers that deliver to said fan. The fan is driven at such speed that the air current forced through the perforate bottom of the trough or runway will pick up and carry to the fan, all but the good wheat, but will leave the good wheat free to run down the trough and from the machine. Of course, for different kinds of separations, the action of the fan will be varied so as to carry away what is considered as foreign materials, but to leave unmolested, or, at least, not to carry away, the prime material which is to be cleaned or separated from such foreign materials.

The invention is illustrated in the accompanying drawings wherein like characters indicate like parts throughout the several views.

Referring to the drawings:

Fig. 1 is a view showing the fanning mill or machine partly in side elevation and partly in vertical section;

Figs. 2 and 3 are transverse sections taken through the machine on the line 2—3 of Fig. 1, looking respectively, toward the left and toward the right in respect to Fig. 1;

Fig. 4 is a front end elevation of the machine with various parts broken away and with some parts sectioned;

Fig. 5 is a vertical section taken approximately on the line 5—5 of Fig. 4;

Fig. 6 is a fragmentary perspective showing the delivery end of a trough-like runway;

Fig. 7 is a detail in elevation showing a lever for oscillating a shoe which carries scalping screens;

Fig. 8 is a detail in elevation showing one of the spring arms for supporting the sieve shoe; and Fig. 9 is an edge elevation of the spring arm shown in Fig. 8.

The machine comprises a rectangular casing 10, the main body portion of which affords a main air chamber 11, a fan casing 12 and a sieve shoe pocket 13, which latter is an open space.

Extending centrally and longitudinally through the main air chamber 11 is an inclined runway trough 14 having a perforate bottom 15 preferably formed of woven wire. The shoe pocket 13 is provided with a port 16 that opens directly into the upper end of the trough 14; and mounted to vibrate transversely of the machine, within said pocket 13, is a shoe 17 shown as equipped with two inclined scalping screens 18 that may be of the same mesh or of different mesh. The shoe 17 is resiliently supported by a pair of laterally spaced spring metal arms or straps 19 rigidly secured at their lower ends to the sides of said shoe and rigidly secured at their upper ends to the sides of a receiving hopper 20 that is rigidly secured to the top of the casing 10, partly by direct engagement therewith and partly by vertical metal tie straps 21. The tie straps 21 (see Figs. 1 and 4) are rigidly attached to the casing 10 at their lower ends and to the hopper 20 at their upper ends, and at their intermediate portions are laterally offset to afford clearance for the transverse vibratory movements of the shoe 17. To provide for the required vibratory movements of the spring arms 19, spacing strips 22 are interposed between the ends of said arms and the shoe 17, in the one instance, and the hopper 20 in the other instance.

The shoe 17 is provided with a forwardly inclined imperforate hopper-like bottom 23 that underlies the scalping sieves 18 and delivers directly to the port 16. Immediately underlying the shoe bottom 23, the upper rear portion of the casing 10 is shown as provided with a fixed deck 10$^a$ that also leads to the port 16.

The fan casing 12, at its inner side, has two large air intake ports 24 that open directly into laterally spaced air chambers 25 formed within the casing 10 below and on opposite sides of the trough 14. These air chambers 25 are spaced so that they do not interfere with the upper flow of air to and through the perforate bottom 15 of the trough 14, but the bottoms of said chambers 25 incline toward the fan casing and deliver directly into the intake passages 24 thereof. The upper portions of these laterally spaced air chambers 25 are in full communication with the main air chamber 11.

Working within the fan casing 12 is a blade-equipped fan head 26 secured to a shaft 27 journaled in suitable bearings on the fan casing and provided at its outer end with a pulley 28, over which a power driven belt, not shown, will run to impart motion to the fan and other moving parts of the machine.

To impart vibratory motion to the sieve shoe 17, I provide a lever 29 which extends through the top of the fan casing and is intermediately pivoted to a bracket 30 secured thereon. At its upper end, the lever 29 is pivotally connected, at 31, to a lug 32 that depends from the bottom 23 of the shoe 17 and works freely through an opening in the deck 10$^a$. At its lower end, the lever 29 has a pronged head 29$^a$ that embraces and is operated upon by a small eccentric 33 carried by the fan shaft 27. Thus, the sieve shoe 17 will be given rapid, but very short stroke vibrations transversely of the machine.

The hopper 20, at its bottom, has a discharge port 20$^a$ that delivers directly onto the upper portion of the upper scalping screen 18. This port 20$^a$ is adapted to be opened and closed by a sliding gate 34, and thus the rate of flow of the material to the scalping sieves may be regulated.

The trough-like runway 14, at its top, is open from its upper end to a point quite near its lower end, but for an important reason which will be hereinafter more fully discussed, the said trough, from the point where it passes through the rear wall of the casing 10 to a point some little distance inward, is bridged by a deflecting plate 35 that is preferably curved in a vertical plane. Also, it is important to note that the upper edges of the side walls of the trough-like runway 14 are provided with outstanding flanges 14$^a$, for a purpose which will also presently appear. The fan casing 12 is provided with air discharge ports 36 adapted to be opened and closed in a desired extent by sliding doors 37.

Operation.

The operation of the machine described, in the separation of succotash, is substantially as follows:

The succotash placed in the hopper 20 will run through the port 20$^a$ thereof onto the upper scalping screen 18. The good wheat, oats, seeds, dirt, and all small particles, will pass through both screens 18 onto the shoe bottom 23 and through the port 16 into the inclined runway 14, but the broken straw and all coarse materials, will pass off from the lower ends of one or the other of the two screens 18.

Under the action of the fan, partial vacuum will be produced in the main air chamber 11, and this will cause an upward current of air to flow through the perforate bottom 15 of the trough 14, and through the stream of commingled grain and materials that will constantly run downward through said trough. As already indicated, this forced air current is not sufficient to carry upward the relatively heavy and relatively smooth good wheat, but is sufficient to carry from the trough all foreign materials, such as dust, seeds, oats, either wild or tame, cockle, small chaff, and the like, and all of these so-called foreign materials will be picked up and carried by the forced air current. The forced air current divides on opposite sides of the trough and turns downward into the air channels 25 and thence passes to the fan, carrying with it, all of the said foreign materials, leaving only the good clean wheat in the runway. The foul air with all of the foreign materials will be blown out through the discharge ports 36, while the good clean wheat will run from the lower end of the trough 14.

In practice, I have found that where the trough-like runway is left open at its top down to the point where it passes through the rear wall of the casing, a considerable part of the foreign materials raised by the air current will strike the rear wall of the casing and follow the rear wall back into the trough through a space where the air current is weak, and thus will become recommingled with the good wheat. However, with the deflector plate 35 applied, as described, the upwardly moving air current, where it passes through the lower portion of the perforate bottom of the trough will be deflected inwardly and upwardly away from the rear wall of the casing, so that the said plate 35 acts as a deflector to carry the foreign materials picked up by the blast at the said point, away from the rear wall, and thus prevents recommingling, with the good wheat, of any foreign materials once lifted from the wheat and out of the trough.

The out-turned flanges 14$^a$ prevent eddy currents at the upper edge of the trough, such as might decrease the efficiency of the air current where the foreign materials first leave the trough.

It is important to note that the laterally spaced air channels 25 have inclined bottoms that deliver into the fan casing, so that even if some of the foreign materials should be precipitated to the bottoms of such air channels, they will, by the action of gravity, or by the combined action of gravity and air blast, ultimately reach the fan and be discharged from the machine, so that there will be no accumulation of material within the machine.

In the operation of the machine, as above described, it is noted that all of the so-called foreign materials, towit, all of the materials except the good wheat is carried from the machine by the air blast. A large part of this foreign material, such as oats, either good oats, pin oats, wild oats and shriveled wheat, and some of the foreign seeds, are valuable for chicken feed and other purposes and should be reclaimed and utilized. This may be done by passing the same through another or similar fanning mill or through the same fanning mill with the air blast adjusted so that when the stock is passed through the inclined trough-like runway, the air blast will carry from the trough only such materials as dust, chaff, and the like, but will leave in the trough those materials above noted which are worth saving and which, for example, make good chicken feed.

What I claim is:

1. A pneumatic grain cleaner having in combination a casing, an inclined trough-like runway extended through said casing and provided with a perforate bottom, said casing forming an air chamber above said trough, and air chambers having imperforate walls extending downwardly at each side of said trough continuous with said air chamber, a fan having a casing with an air intake port in communication with said latter air chambers, the outlet of said fan casing being directed outside of said casing into the atmosphere, whereby the lighter material fed into said runway is carried upwardly out of the same and downwardly at each side thereof into said fan casing.

2. The structure set forth in claim 1, said intake for the fan casing being located below the upper end of said runway.

3. The structure set forth in claim 1, the intake opening of said fan casing being located beneath the trough at one end of the casing and said air chambers having bottoms inclining downwardly into said intake opening.

4. The structure set forth in claim 1, said runway having substantially vertical sides, and the inner sides of said downwardly extending air chambers being in substantial alinement with said sides whereby the bottom of said trough is exposed to the atmosphere.

5. A pneumatic grain cleaner having in combination a casing, a downwardly inclined trough having substantially vertical sides extending through said casing, said casing forming an air chamber above said trough and downwardly extending air chambers at each side thereof, the inner walls of said downwardly extending air chambers being imperforate in substantial alinement with and formed by the sides of said trough, and baffles on the walls of said air chambers for preventing eddy currents therein whereby all of the air carried material will be discharged from said chambers.

6. A fanning mill comprising a casing forming an air chamber, an inclined trough-like runway extended within said casing and provided with a perforate bottom, and a fan arranged to produce a forced current of air upward through the bottom of said trough and operating to carry certain foreign materials from said trough and to discharge all of such foreign materials through said fan and out of said casing, said trough, at its lower end, adjacent to the rear wall of said casing having a deflecting plate bridging the trough to a point inward an appreciable distance from said rear wall.

7. A fanning mill comprising a casing forming an air chamber, an inclined trough-like runway extended within said casing and provided with a perforate bottom, and a fan arranged to produce a forced current of air upward through the bottom of said trough and operating to carry certain foreign materials from said trough and to discharge all of such foreign materials through said fan and out of said casing, said trough, at its lower end, adjacent to the rear wall of said casing having a deflecting plate bridging the trough to a point inward a considerable distance from said rear wall, the said deflecting plate being curved in a vertical plane and operating as a deflector substantially as described.

8. A fanning mill having in combination a casing, an enclosed trough-like runway extended through said casing and provided with a perforate bottom, suction means for producing an air current upwardly through the bottom of said runway into said casing, and flanges extending laterally from said runway to prevent the formation of eddy currents.

9. A fanning mill having in combination a casing, an enclosed troughlike runway extended through said casing and provided with a perforate bottom, one end of said casing having an opening therein through which said trough discharges, a curved baffle extending from said end of the casing above and adjacent the perforate bottom of said runway and between the sides thereof having its inner end curved upwardly, and suction means for producing an air blast upwardly through the bottom of said trough into the casing.

10. A pneumatic grain cleaner having in combination a substantially closed casing, an inclined trough having a perforate bottom extending therethrough, said casing forming an air chamber above said trough, air chambers extending downwardly at each side of said trough having imperforate walls alined with the sides of the trough and formed thereby and by said casing, a fan having an air intake below said trough in communication with said latter air chambers, the outlet of the fan being directed into the atmosphere and the perforate bottom of said trough being in communication with the atmosphere.

In testimony whereof I affix my signature in presence of two witnesses.

WILLIAM T. MERZENICH.

Witnesses:
 FRANCIS C. CARY,
 M. SCHNITTGEN.